April 27, 1954  G. H. COOK  2,676,517
OPTICAL OBJECTIVES COMPRISING SIX AIR SPACED
COMPONENTS ENCLOSING A DIAPHRAGM
Filed Oct. 20, 1952
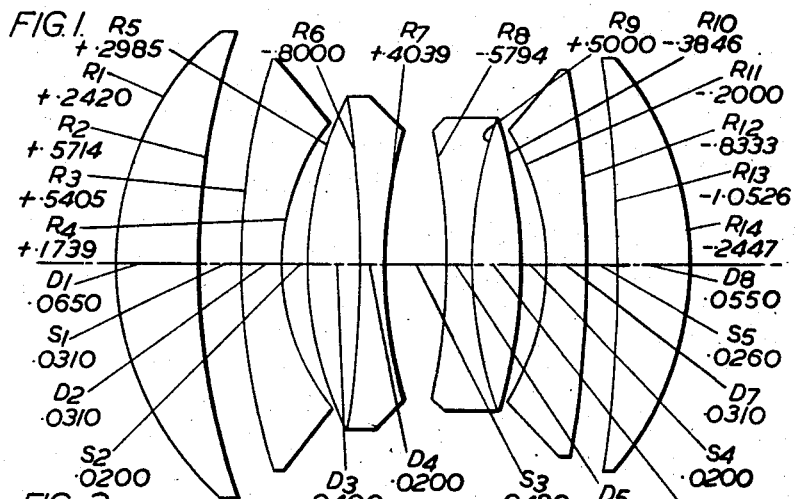
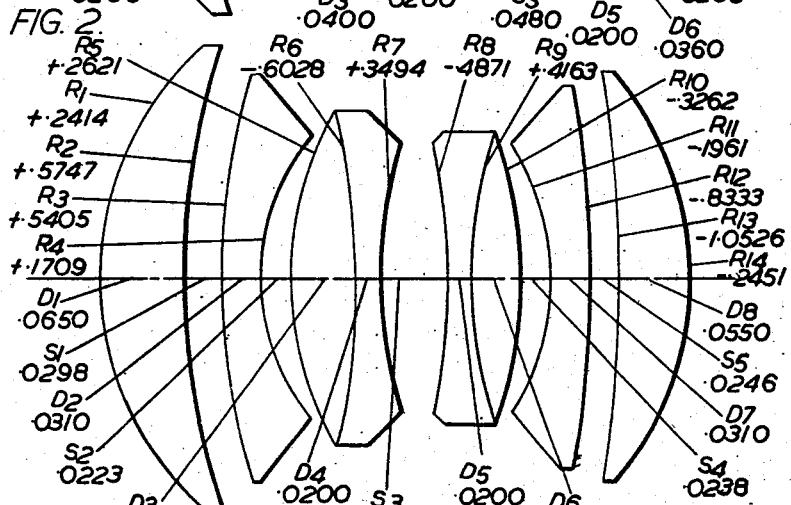
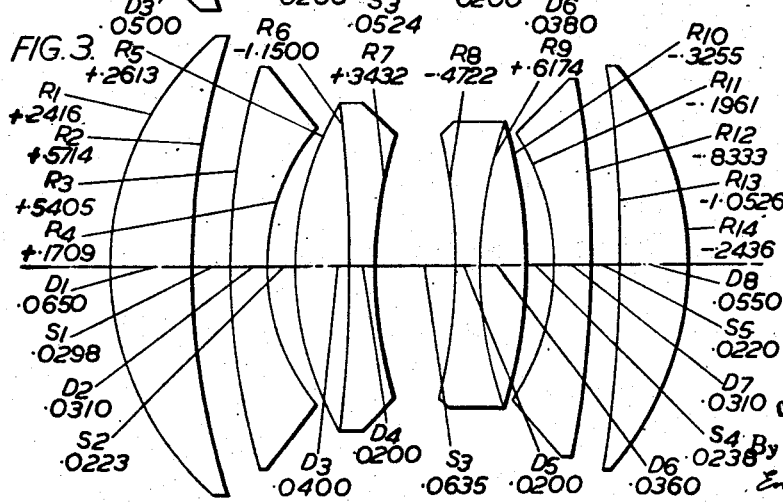
Inventor
Gordon H. Cook
By
Emery Holcombe & Blair
Attorney Patented Apr. 27, 1954

2,676,517

UNITED STATES PATENT OFFICE 2,676,517

OPTICAL OBJECTIVES COMPRISING SIX AIR SPACED COMPONENTS ENCLOSING A DIAPHRAGM

Gordon Henry Cook, Leicester, England, assignor to Taylor, Taylor & Hobson Limited, Leicester, England, a British company Application October 20, 1952, Serial No. 315,631

Claims priority, application Great Britain October 29, 1951

21 Claims. (Cl. 88—57)

This invention relates to an optical objective, more especially for photographic purposes, corrected for spherical and chromatic aberrations, coma, astigmatism, field curvature and distortion, and comprising two simple divergent components located between two simple convergent outer components and embracing between them two convergent inner components of meniscus form with their air-exposed surfaces concave towards a diaphragm between them, the outer surfaces of the convergent outer components and the inner surfaces of the divergent components also being concave towards the diaphragm.

The inventions of the Letters Patent of the United States of America Nos. 2,601,592 and 2,601,594, are each concerned with a well-corrected objective of this type having a high relative aperture and wide covering power and also having improved correction for zonal spherical aberration and oblique spherical aberration. The inventions have the further advantage of making it possible to have diameters larger than are needed for the axial beam alone in order to avoid the vignetting which would otherwise be ojectionable with the wide angular field covered.

In the objectives forming the subject of such patents, the convergent inner components were simple, and the present invention is concerned with a modification of such objectives, which, whilst retaining all the advantages of such objectives has a further advantage in comparison therewith in that it permits a wider choice of material for the elements of the objective.

In the objective according to the present invention the two convergent inner components are compound and each include a collective internal contact surface convex to the diaphragm, the arithmetic mean between the positive values of the radii of curvature of such contact surfaces lying between .20 F and 2.0 F, where F is the equivalent focal length of the whole objective, whilst the arithmetic mean between the mean refractive indices of the materials of the convergent outer elements of the compound inner components exceeds the arithmetic mean between the mean refractive indices of the materials of the divergent inner elements of such components by between .03 and .13.

Several of the features of the objectives of such patents are equally applicable to that of the present invention. Thus the sum of the equivalent focal lengths of the two convergent inner components preferably lies between 1.6 F and 2.6 F, the arithmetic mean between the positive values of the radii of curvature of the outer surfaces of such inner components lying between .20 F and .44 F.

The arithmetic mean of the axial distances between the outer surfaces of the convergent outer components and the inner surfaces of the adjacent divergent components preferably lies between .08 F and .17 F. The arithmetic mean of the axial air separations between the divergent components and the convergent inner components and the arithmetic mean of the axial air separations between the divergent components and the convergent outer components preferably each lie between .01 F and .1 F.

The arithmetic mean of the positive values of the radii of curvature of the inner surfaces of the divergent components preferably lies between .11 F and .25 F. The outer surfaces of the divergent components are also preferably concave towards the diaphragm, the radii of curvature of such surfaces respectively lying between F/3 and 5 F in the front half and between F/2 and $\infty$ in the rear half of the objective.

The arithmetic mean of the positive values of the radii of curvature of the outer surfaces of the convergent outer components preferably lies between .18 F and .3 F. The inner surfaces of such outer components are also preferably concave towards the diaphragm, the radii of curvature of such surfaces respectively lying between F/3 and 5 F in the front half and between F/2 and $\infty$ in the rear half of the objective.

It should be made clear that the terms "front" and "rear" are used herein in accordance with the usual convention to indicate the sides of the objective respectively nearer to and further from the longer conjugate.

In the accompanying drawings,

Figures 1, 2 and 3 respectively show three alternative practical examples of objective according to the invention.

Numerical data for these three examples are given in the following tables in which $R_1 R_2$ . . . represent the radii of curvature of the individual surfaces of the objective, the positive sign indicating that the surface is convex to the front and the negative sign that it is concave thereto, $D_1 D_2$ ... represent the axial thicknesses of the various elements, and $S_1 S_2$ ... represent the axial air separations between the components. The tables also give the mean refractive indices $n_D$ for the D-line and the Abbé V numbers of the materials of the various elements.

The insertion of equals (=) signs in the radius columns of the tables, in company with plus (+) and minus (−) signs which indicate whether the surface is convex or concave to the front, is for conformity with the usual Patent Office custom, and it is to be understood that these signs are not to be interpreted wholly in their mathematical significance. This sign convention agrees with the mathematical sign convention required for the computation of some of the aberrations including the primary aberrations, but different mathematical sign conventions are required for other purposes including computation of some of the secondary aberrations, so that a radius indicated for example as positive in the tables may have to be treated as negative for some calculations as is well understood in the art.

Example I

[Equivalent focal length 1.000     Relative Aperture F/3.5]

| Radius | Thickness or Air Separation | Refractive Index $n_D$ | Abbé V Number |
|---|---|---|---|
| $R_1 = +.2420$ | | | |
| | $D_1 = .0650$ | 1.6134 | 59.3 |
| $R_2 = +.5714$ | | | |
| | $S_1 = .0310$ | | |
| $R_3 = +.5405$ | | | |
| | $D_2 = .0310$ | 1.6048 | 43.8 |
| $R_4 = +.1739$ | | | |
| | $S_2 = .0200$ | | |
| $R_5 = +.2985$ | | | |
| | $D_3 = .0400$ | 1.6134 | 59.3 |
| $R_6 = -.8000$ | | | |
| | $D_4 = .0200$ | 1.5304 | 52.0 |
| $R_7 = +.4039$ | | | |
| | $S_3 = .0480$ | | |
| $R_8 = -.5794$ | | | |
| | $D_5 = .0200$ | 1.5304 | 52.0 |
| $R_9 = +.5000$ | | | |
| | $D_6 = .0360$ | 1.6134 | 56.8 |
| $R_{10} = -.3846$ | | | |
| | $S_4 = .0200$ | | |
| $R_{11} = -.2000$ | | | |
| | $D_7 = .0310$ | 1.6048 | 43.8 |
| $R_{12} = -.8333$ | | | |
| | $S_5 = .0260$ | | |
| $R_{13} = -1.0526$ | | | |
| | $D_8 = .0550$ | 1.6134 | 59.3 |
| $R_{14} = -.2447$ | | | |

Example II

[Equivalent focal length 1.000     Relative Aperture F/3.5]

| Radius | Thickness or Air Separation | Refractive Index $n_D$ | Abbé V Number |
|---|---|---|---|
| $R_1 = +.2414$ | | | |
| | $D_1 = .0650$ | 1.61272 | 58.6 |
| $R_2 = +.5747$ | | | |
| | $S_1 = .0298$ | | |
| $R_3 = +.5405$ | | | |
| | $D_2 = .0310$ | 1.60562 | 43.9 |
| $R_4 = +.1709$ | | | |
| | $S_2 = .0223$ | | |
| $R_5 = +.2621$ | | | |
| | $D_3 = .0500$ | 1.61272 | 58.6 |
| $R_6 = -.6028$ | | | |
| | $D_4 = .0200$ | 1.54814 | 45.9 |
| $R_7 = +.3494$ | | | |
| | $S_3 = .0524$ | | |
| $R_8 = -.4871$ | | | |
| | $D_5 = .0200$ | 1.54814 | 45.9 |
| $R_9 = +.4163$ | | | |
| | $D_6 = .0380$ | 1.61117 | 55.8 |
| $R_{10} = -.3262$ | | | |
| | $S_4 = .0238$ | | |
| $R_{11} = -.1961$ | | | |
| | $D_7 = .0310$ | 1.60562 | 43.9 |
| $R_{12} = -.8333$ | | | |
| | $S_5 = .0246$ | | |
| $R_{13} = -1.0526$ | | | |
| | $D_8 = .0550$ | 1.61117 | 55.8 |
| $R_{14} = -.2451$ | | | |

Example III

[Equivalent focal length 1.000     Relative Aperture F/3.5]

| Radius | Thickness or Air Separation | Refractive Index $n_D$ | Abbé V Number |
|---|---|---|---|
| $R_1 = +.2416$ | | | |
| | $D_1 = .0650$ | 1.6134 | 59.3 |
| $R_2 = +.5714$ | | | |
| | $S_1 = .0298$ | | |
| $R_3 = +.5405$ | | | |
| | $D_2 = .0310$ | 1.6048 | 43.8 |
| $R_4 = +.1709$ | | | |
| | $S_2 = .0223$ | | |
| $R_5 = +.2613$ | | | |
| | $D_3 = .0400$ | 1.6134 | 59.3 |
| $R_6 = -1.1500$ | | | |
| | $D_4 = .0200$ | 1.5304 | 52.0 |
| $R_7 = +.3432$ | | | |
| | $S_3 = .0635$ | | |
| $R_8 = -.4722$ | | | |
| | $D_5 = .0200$ | 1.5304 | 52.0 |
| $R_9 = +.6174$ | | | |
| | $D_6 = .0360$ | 1.6134 | 56.8 |
| $R_{10} = -.3255$ | | | |
| | $S_4 = .0238$ | | |
| $R_{11} = -.1961$ | | | |
| | $D_7 = .0310$ | 1.6048 | 43.8 |
| $R_{12} = -.8333$ | | | |
| | $S_5 = .0220$ | | |
| $R_{13} = -1.0526$ | | | |
| | $D_8 = .0550$ | 1.6134 | 59.3 |
| $R_{13} = -.2436$ | | | |

In these examples, which are corrected to cover a semiangular field of 25 degrees, the diaphragm is located approximately midway between the surfaces $R_7$ and $R_8$. All six components of the objective are of meniscus form with their air-exposed surfaces concave to the diaphragm.

The internal contact surfaces $R_6$ and $R_9$ in the compound convergent inner components are collective and convex towards the diaphragm, and the arithmetic means of the positive values of their radii of curvature is .6500 F in Example I, .5095 in Example II and .8837 in Example III. The mean refractive index difference across each of these contact surfaces is .0830 in Examples I and III and .0638 in Example II.

In Example I, the equivalent focal length of the compound convergent front inner component is 1.06 F and that of the rear inner component is 1.12 F, so that the sum of these focal lengths is 2.18 F. The corresponding values in Example II are .97 F, 1.03 F and 2.00 F, and in Example III .99 F, 1.03 F and 2.02 F. The arithmetic means of the positive values of the radii $R_5$ and $R_{10}$ is .3415 F in Example I, .2942 F in Example II, and .2934 F in Example III.

The axial distances between the surfaces $R_1$ and $R_4$ and between the surfaces $R_{11}$ and $R_{14}$ in Example I are respectively .1270 F and .1120 F, so that their arithmetic mean is .1195 F, the corresponding values for Example II being .1258 F, .1106 F and .1182 F, and for Example III .1258 F, .1080 F and .1169 F. The arithmetic mean of the two outer air separations $S_1$ and $S_5$ is .0285 F in Example I, .0272 F in Example II and .0259 F in Example III, and that of the air separations $S_2$ and $S_4$ is .0200 F in Example I and .0230 F in Examples II and III.

The arithmetic means of the positive values of the radii $R_4$ and $R_{11}$ is .1870 F in Example I and .1835 F in Examples II and III, and that of the radii $R_1$ and $R_{14}$ is .2433 F in Examples I and II and .2426 F in Example III.

It should be explained that, whilst Examples I and III are both corrected for the usual photographic spectrum range, Example II has been designed for special purposes and is corrected for a spectrum range including the red end of the visible spectrum and a portion of the infra-red range, the best performance being obtained at a wave-length of 768μ.

The invention makes it possible to have diameters for the various components larger than is required for the axial beam alone, and such larger diameters are very valuable in facilitating correction for oblique aberrations and contribute towards the wide angular field which can be covered by objectives according to the invention. Thus, in the examples given above, the effective diameters of the individual surfaces may conveniently be .36 F for $R_1$ and $R_2$, .32 F for $R_3$, .22 F for the chamfer of $R_4$, .26 F for $R_5$ and $R_6$, .21 F for the chamfers of $R_7$ and $R_8$, .23 F for $R_9$ and $R_{10}$, .21 F for the chamfer $R_{11}$, .30 F for $R_{12}$, and .32 F for $R_{13}$ and $R_{14}$.

What I claim as my invention and desire to secure by Letters Patent is:

1. An optical objective corrected for spherical and chromatic aberrations, coma, astigmatism, field curvature and distortion, and comprising a diaphragm, two compound convergent inner components of meniscus form embracing the diaphragm between them and each including a collective internal contact surface convex towards the diaphragm the air-exposed surfaces of these components being concave towards the diaphragm, two simple divergent components embracing the inner components between them and having their inner surfaces concave towards the diaphragm, and two simple convergent outer components embracing the divergent components between them and having their outer surfaces concave towards the diaphragm, the arithmetic mean between the positive values of the radii of curvature of the internal contact surfaces in the compound inner components lying between .20 F and 2.0 F, where F is the equivalent focal length of the objective, whilst the arithmetic mean between the mean refractive indices of the materials of the convergent outer elements of the compound inner components exceeds the arithmetic mean between the mean refractive indices of the materials of the divergent inner elements of such inner components by between .03 and .13.

2. An optical objective as claimed in claim 1, in which the arithmetic mean of the axial distances between the outer surfaces of the convergent outer components and the inner surfaces of the adjacent divergent components lies between .08 F and .17 F.

3. An optical objective as claimed in claim 2, in which the arithmetic mean of the axial air separations between the divergent components and the convergent inner components and the arithmetic mean of the axial air separations between the divergent components and the convergent outer components each lie between .01 F and .1 F.

4. An optical objective as claimed in claim 2, in which the arithmetic mean of the positive values of the radii of curvature of the inner surfaces of the divergent components lies between .11 F and .25 F.

5. An optical objective as claimed in claim 2, in which the outer surfaces of the divergent components are concave towards the diaphragm, the radii of curvature of such surfaces respectively lying between F/3 and 5 F in the front half and between F/2 and $\infty$ in the rear half of the objective.

6. An optical objective as claimed in claim 2, in which the arithmetic mean of the positive values of the radii of curvature of the two outermost surfaces of the objective lies between .18 F and .3 F.

7. An optical objective as claimed in claim 2, in which the inner surfaces of the outer components are concave towards the diaphragm and their radii of curvature lie respectively between F/3 and 5 F in the front half and between F/2 and $\infty$ in the rear half.

8. An optical objective as claimed in claim 1, in which the arithmetic mean of the axial air separations between the divergent components and the convergent inner components and the arithmetic mean of the axial air separations between the divergent components and the convergent outer components each lie between .01 F and .1 F.

9. An optical objective as claimed in claim 1, in which the arithmetic mean of the positive values of the radii of curvature of the inner surfaces of the divergent components lies between .11 F and .25 F.

10. An optical objective as claimed in claim 1, in which the outer surfaces of the divergent components are concave towards the diaphragm, the radii of curvature of such surfaces respectively lying between F/3 and 5 F in the front half and between F/2 and $\infty$ in the rear half of the objective.

11. An optical objective as claimed in claim 1, in which the arithmetic mean of the positive values of the radii of curvature of the two outermost surfaces of the objective lies between .18 F and .3 F.

12. An optical objective as claimed in claim 1, in which the inner surfaces of the outer components are concave towards the diaphragm and their radii of curvature lie respectively between F/3 and 5 F in the front half and between F/2 and $\infty$ in the rear half.

13. An optical objective corrected for spherical and chromatic aberrations, coma, astigmatism, field curvature and distortion, and comprising a diaphragm, two compound convergent inner components of meniscus form embracing the diaphragm between them and each including a collective internal contact surface convex towards the diaphragm the air-exposed surfaces of these components being concave towards the diaphragm, two simple divergent components embracing the inner components between them and having their inner surfaces concave towards the diaphragm, and two simple convergent outer components embracing the divergent components between them and having their outer surfaces concave towards the diaphragm, the arithmetic mean between the positive values of the radii of curvature of the internal contact surfaces in the compound inner components lying between .20 F and 2.0 F, where F is the equivalent focal length of the objective, whilst the arithmetic mean between the mean refractive indices of the materials of the convergent outer elements of the compound inner components exceeds the arithmetic mean between the mean refractive indices of the materials of the divergent inner elements of such inner components by between .03 and .13, the sum of the equivalent focal lengths of the two compound convergent inner components lying between 1.6 F and 2.6 F, whilst the arithmetic mean between the positive values of the radii of curvature of the outer surfaces of such compound inner components lies between .20 F and .44 F.

14. An optical objective as claimed in claim 13, in which the arithmetic mean of the axial distances between the outer surfaces of the convergent outer components and the inner surfaces of the adjacent divergent components lies between .08 F and .17 F.

15. An optical objective as claimed in claim 14, in which the arithmetic mean of the axial air separations between the divergent components and the convergent inner components and the arithmetic mean of the axial air separations between the divergent components and the convergent outer components each lie between .01 F and .1 F.

16. An optical objective as claimed in claim 14, in which the arithmetic mean of the positive values of the radii of curvature of the inner surfaces of the divergent components lies between .11 F and .25 F.

17. An optical objective as claimed in claim 13, in which the arithmetic mean of the axial air separations between the divergent components and the convergent inner components and the arithmetic mean of the axial air separations between the divergent components and the convergent outer components each lie between .01 F and .1 F.

18. An optical objective as claimed in claim 13, in which the arithmetic mean of the positive values of the radii of curvature of the inner surfaces of the divergent components lies between .11 F and .25 F.

19. An optical objective as claimed in claim 13, in which the outer surfaces of the divergent components are concave towards the diaphragm, the radii of curvature of such surfaces respectively lying between F/3 and 5 F in the front half and between F/2 and ∞ in the rear half of the objective.

20. An optical objective as claimed in claim 13, in which the arithmetic mean of the positive values of the radii of curvature of the two outermost surfaces of the objective lies between .18 F and .3 F.

21. An optical objective as claimed in claim 13, in which the inner surfaces of the outer components are concave towards the diaphragm and their radii of curvature lie respectively between F/3 and 5 F in the front half and between F/2 and ∞ in the rear half.

References Cited in the file of this patent

UNITED STATES PATENTS

| Number | Name | Date |
|---|---|---|
| 2,601,592 | Cook | June 24, 1952 |
| 2,601,594 | Cook | June 24, 1952 |

FOREIGN PATENTS

| Number | Country | Date |
|---|---|---|
| 427,008 | Great Britain | Apr. 12, 1935 |
| 665,520 | Germany | Sept. 27, 1938 |